March 26, 1929.  H. A. HARTZELL ET AL  1,707,121
RUMBLE SEAT INCLOSURE
Filed April 25, 1927   3 Sheets-Sheet 1
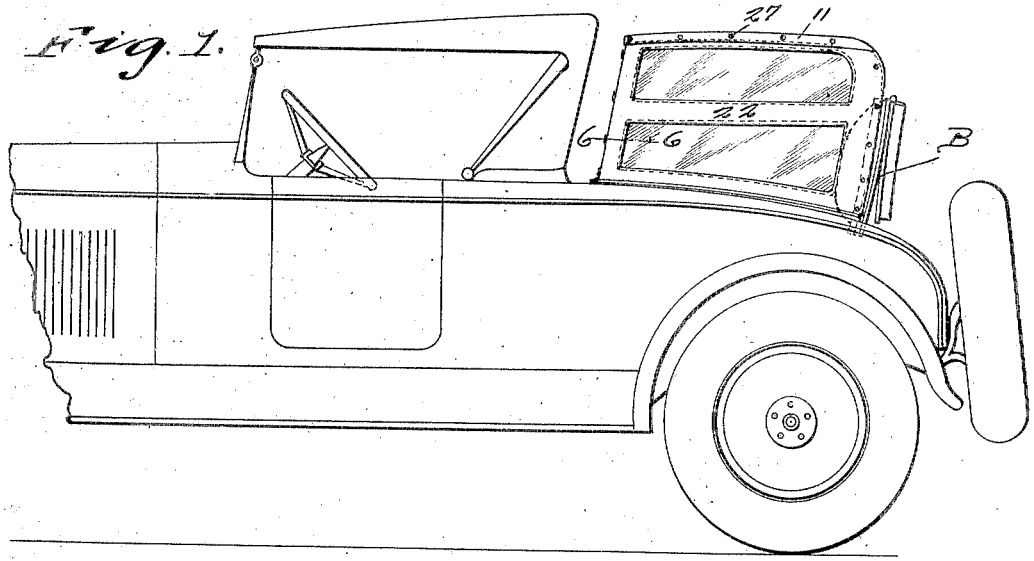
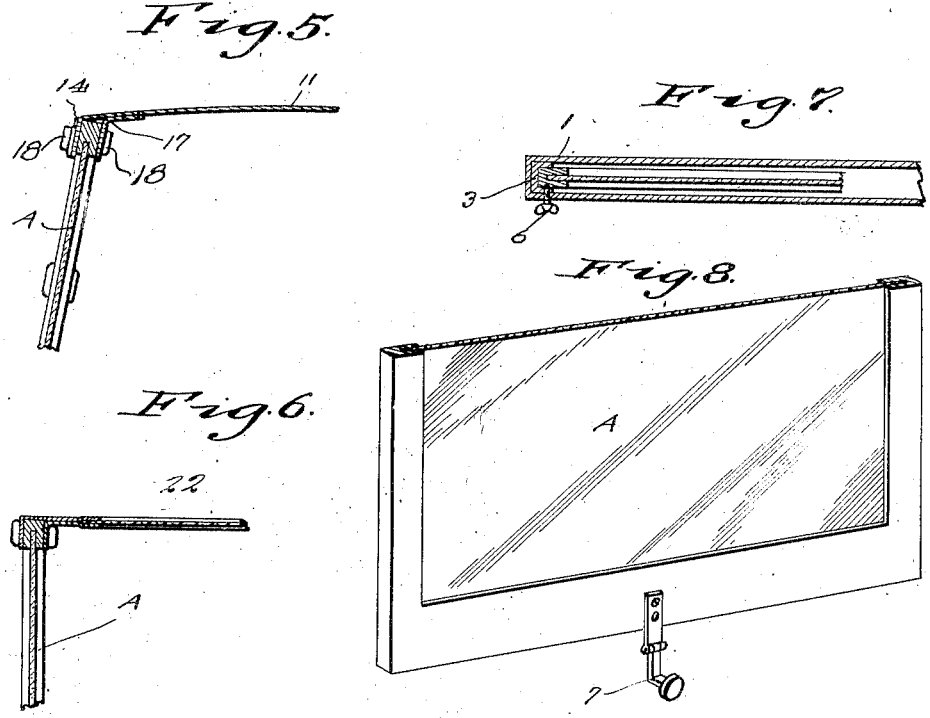
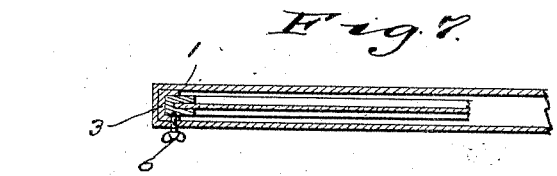
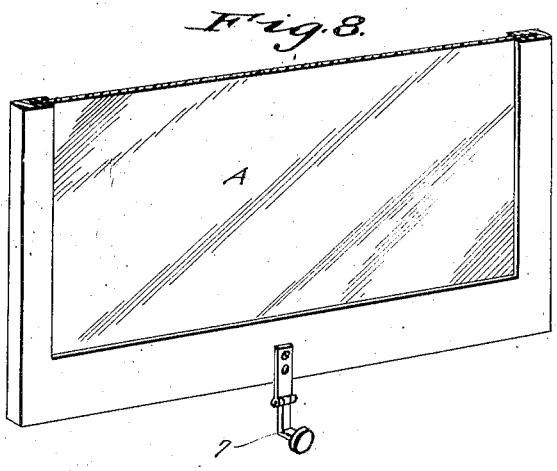
H.A. Hartzell
H.F. Hooper   INVENTOR
BY *Victor J. Evans*
ATTORNEY
WITNESS:

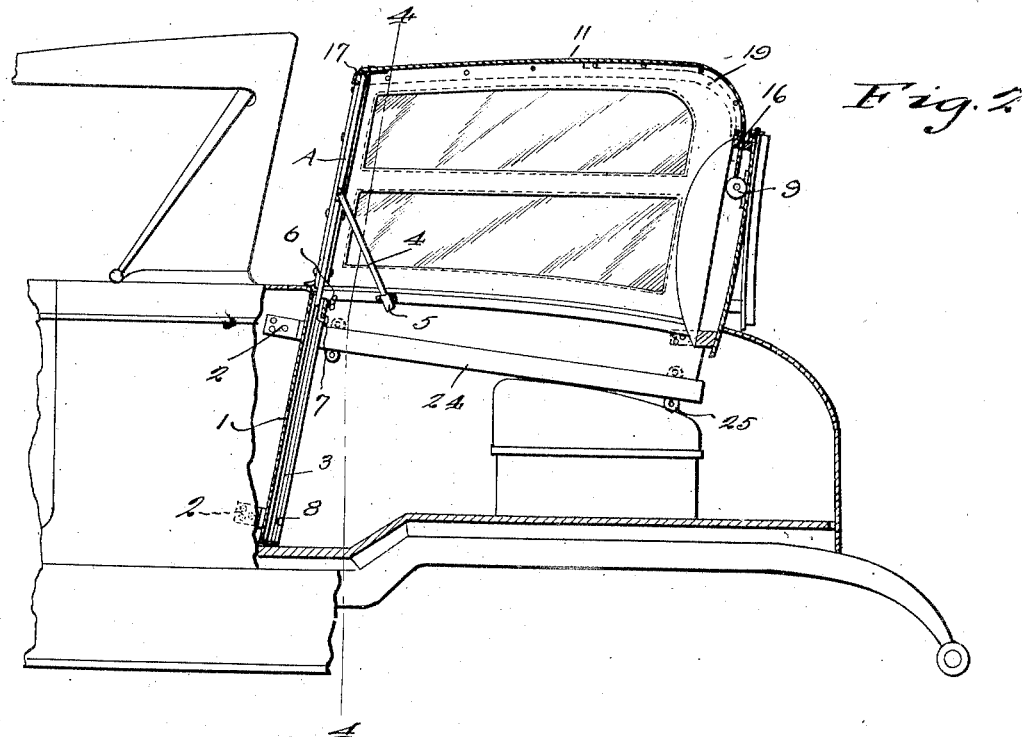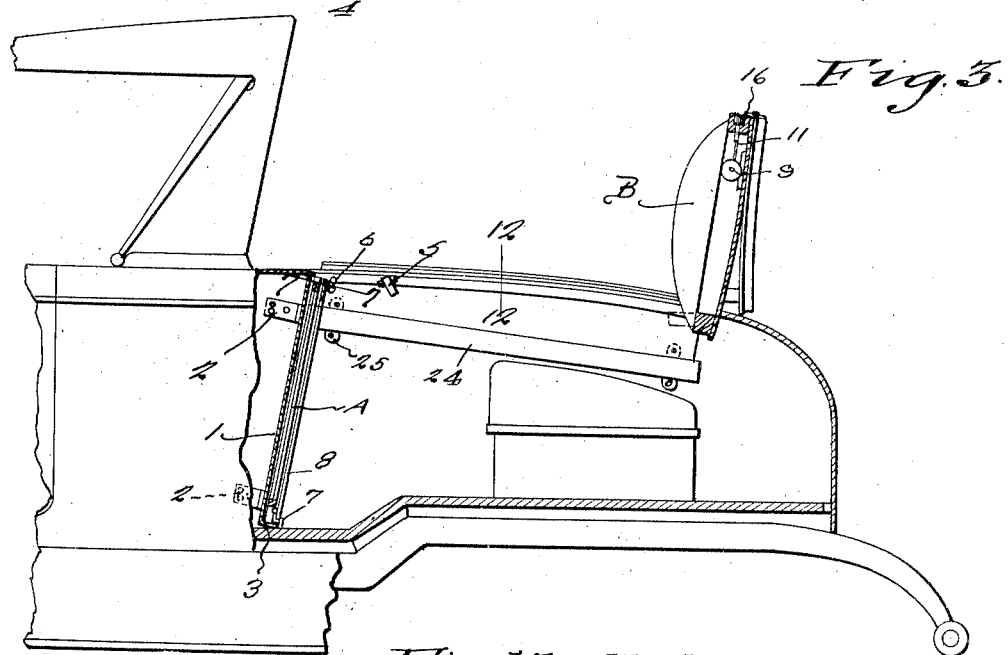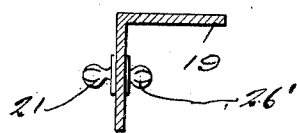

March 26, 1929.  H. A. HARTZELL ET AL  1,707,121
RUMBLE SEAT INCLOSURE
Filed April 25, 1927  3 Sheets-Sheet 3
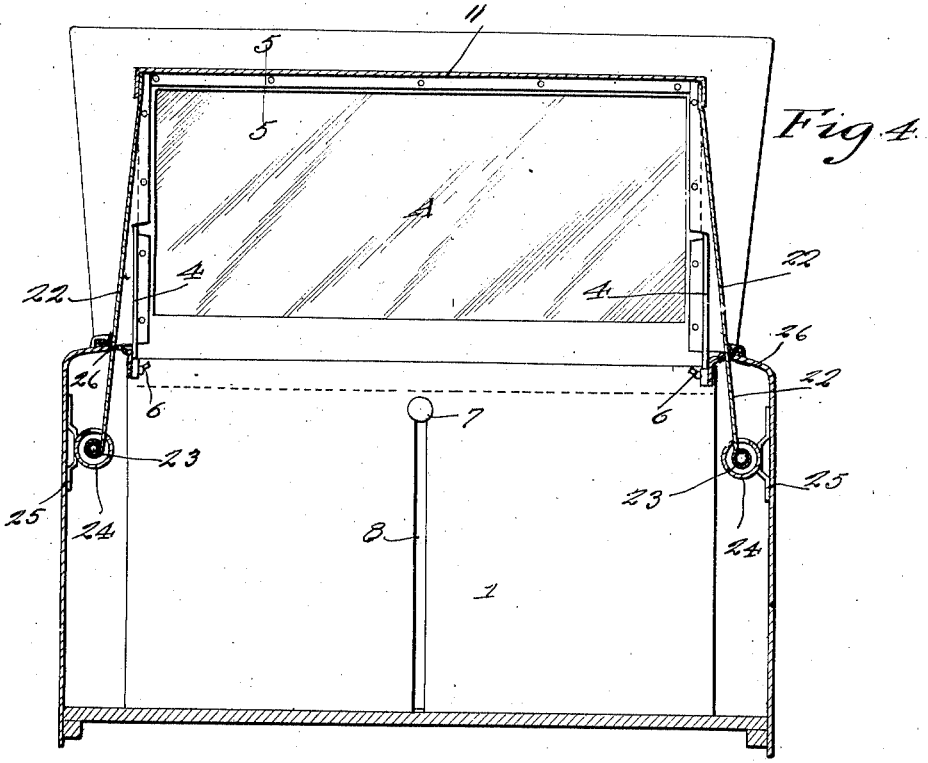
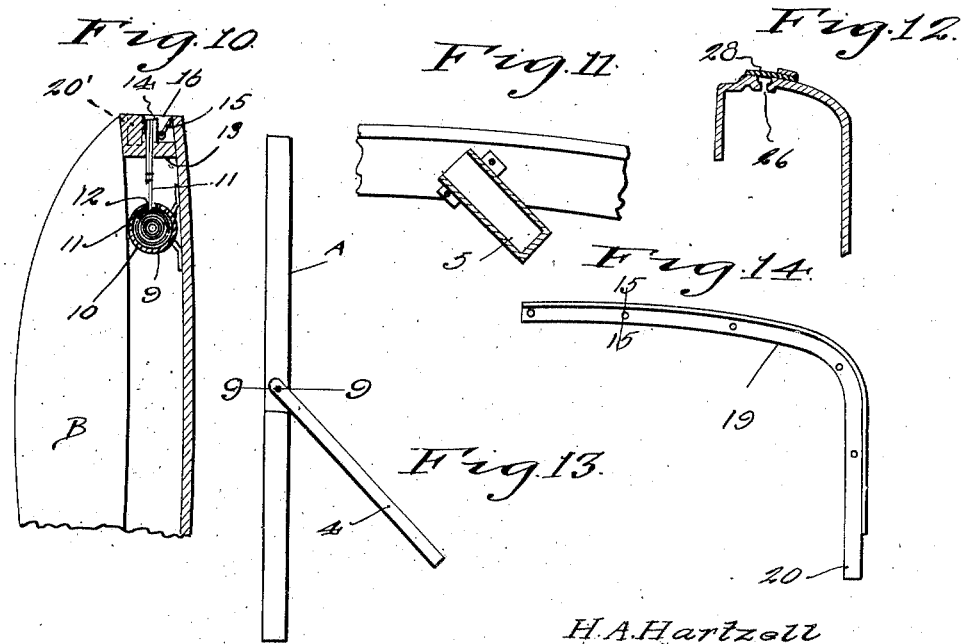
H. A. Hartzell
H. F. Hooper  INVENTOR
BY *Victor J. Evans*
ATTORNEY Patented Mar. 26, 1929.

1,707,121

UNITED STATES PATENT OFFICE.

HARRY A. HARTZELL AND HOMER F. HOOPER, OF HARRISBURG, PENNSYLVANIA.

RUMBLE-SEAT INCLOSURE.

Application filed April 25, 1927. Serial No. 186,428.

This invention relates to an inclosure for the occupants of a rumble seat, the general object of the invention being to provide top and side curtains which are arranged on spring rollers positioned within portions of the vehicle adjacent the seat, with supports for holding the top curtain in a position where it will extend over the seat and the occupants thereof and means for connecting the side curtains with the supports.

A further object of the invention is to provide a windshield which is slidably arranged in the body and which may be raised in front of the occupants of the rumble seat, with means for attaching the curtains to the windshield when the curtains are to be used therewith.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1 is a view of a roadster showing the rumble seat inclosure in use thereon.

Figure 2 is a vertical sectional view drawn on an enlarged scale.

Figure 3 is a similar view but with the inclosure in inoperative position.

Figure 4 is a section on line 4—4 of Figure 2.

Figure 5 is a section on line 5—5 of Figure 4.

Figure 6 is a section on line 6—6 of Figure 1.

Figure 7 is a section on line 7—7 of Figure 3.

Figure 8 is a perspective view of a portion of the windshield.

Figure 9 is a section on line 9—9 of Figure 13.

Figure 10 is an enlarged vertical sectional view through the back of the rumble seat, showing the top curtain in wound-up condition.

Figure 11 is a fragmentary view with parts in section, showing the socket for receiving a windshield brace.

Figure 12 is a section on line 12—12 of Figure 3.

Figure 13 is an edge view of the windshield and showing its brace in operative position.

Figure 14 is a view of one of the top supporting members.

Figure 15 is a section on line 15—15 of Figure 14.

In these drawings, 1 indicates a narrow casing placed within the body of the vehicle in front of the rumble seat thereof and fastened to the walls of the body by the brackets 2. This casing contains the guideways 3 for a windshield A designed for the protection of the occupants of the rumble seat of the vehicle. When not in use, this windshield is located wholly within the casing 1 so that it will be out of the way and these parts are so arranged that they will not interfere with the closing of the rumble seat compartment. When the windshield is desired to be used, it is simply necessary to pull it up out of the casing and to place the ends of the braces 4, pivoted to the side edges of the windshield, into the ends of the sockets 5 which are fastened to the side walls of the opening for the rumble seat and to tighten the thumb screws 6 which pass through the casing and the guideways and engage the frame of the windshield. Thus the windshield will be held in front of the occupants. The thumb screws also can be tightened after the windshield has been pushed back into its casing to prevent the same from rattling in the casing. As shown in Figure 13, the braces 4 are so attached to the edges of the windshield that they will enter the casing also when folded against the windshield. A handle 7 is pivotally connected with the bottom of the windshield and passes through a slot 8 in the front of the casing, so that by grasping this handle the windshield can be raised and lowered. By pivoting the handle to the windshield, the windshield can be tilted after it has been raised to permit the ends of the braces 4 to be inserted into the sockets 5.

A cylinder 9 is placed in a space in the rumble seat back B and a spring roller 10 is placed in said cylinder and contains a top curtain 11 which is formed with any suitable material. This curtain passes through a slot 12 formed in the cylinder and through a slot 13 formed in the top or outer edge of the back B and the curtain, at its outer end, carries a reinforcing strip 14 which is provided with a ring 15. This reinforcing strip prevents the end of the curtain from passing entirely through the slot 13 and the ring 15 facilitates the withdrawal of the curtain from its cylinder. The outer or top edge of the back B contains a recess 16 which receives the reinforcing strip and the ring when the top curtain is in rolled-up condition, as clearly shown in Figure 10. The outer end of the curtain is also provided with a flap 17 and this flap and the end of the curtain carry the female members 18 of snap fasteners, the male members of which are arranged at the top of the windshield so that the curtain can be attached to the top of the windshield. The flap engages the inner edge of the top of the frame of the windshield while the end of the curtain engages the outer edge or face thereof, as clearly shown in Figure 5.

We also provide a pair of supporting members 19 for the top curtain, each member being formed of angle shape in cross section and having a reduced end 20 for engaging a socket 20' formed in each end of the outer or top edge of the back B, as shown in Figure 10, so that by placing the reduced ends 20 of the supports 19 in these sockets 20', the supports will be held in position to hold the top curtain, as shown in Figures 1 and 2. These supports 19 are provided with the male members 21 of snap fasteners which are engaged by the female members at the sides of the top curtain.

Thus the top curtain will be firmly held by the windshield and the supports 19 in an extended position over the occupants of the seat to protect them from the elements.

We also provide a pair of side curtains 22 and each side curtain is carried by a spring roller 23 arranged in a slotted cylinder 24 which is supported on the interior side walls of the body of the vehicle by the brackets 25. These side curtains pass through slots 26 formed in the sides of the top parts of the body and are adapted to be fastened to the supports 19 and to the side flaps of the top curtain by the snap fasteners 27, some of the male portions of which are secured to the inner sides of the supports, as shown at 26'. The front edges of these side curtains are also adapted to be fastened to the sides of the windshield frame by snap fasteners or the like. The slots 26 are adapted to be closed by the flaps 28 formed of rubber or the like, and these flaps are designed to engage the outer faces of the side curtains, when the curtains are raised, to prevent water from running down the side curtains through the slots, as shown in Figure 4.

From the foregoing it will be seen that we have provided simple means for enclosing the occupants of a rumble seat of a motor vehicle so as to protect the occupants from the elements, and when not in use, all parts of the inclosure are contained within the body so that they will be hidden from view and will be out of the way. The different parts of the inclosure can also be quickly raised to operative position. It will also be seen that the windshield can be used alone and that the top curtain can be used with the windshield without raising the side curtains and that one of the side curtains can be raised without the other, if desired.

When not in use, the supports 19 are pulled from their sockets and placed in the rumble seat compartment. As shown, each member 19 is formed with a vertical part and a substantially horizontal part, the vertical portions of these members supporting the rear portion of the top curtain 11 and the rear ends of the side curtains 22, and the horizontal portions of said members 19 supporting the top part of the curtain 11 and the top portions of the side curtains 22.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:—

1. An inclosure for the rumble seat of a motor vehicle comprising a windshield slidably arranged in the body of the vehicle so that it can be raised to a position in front of the occupants of the seat, means for holding it in raised position, a top curtain, a spring roller arranged in the back of the seat to which one end of the curtain is connected, detachable supporting members for the sides of the curtain, each comprising a vertical portion and a substantially horizontal portion, socket members at the upper edge of the back of the rumble seat for receiving the lower ends of the vertical portions of said members, means for detachably connecting the curtain to the said members and to the top of the windshield, a pair of side curtains, spring rollers within the body of the vehicle to which the inner ends of the side curtains are connected and means for detachably connecting the side curtains to the sides of the top curtain and to the sides of the windshield.

2. In combination with a motor vehicle, a casing within the body thereof and having a slot in one side thereof, a windshield sliding in the casing, a handle on the windshield extending through the slot, a brace connected with each side of the windshield, socket members for receiving the free ends of the braces to hold the windshield in raised position, clamping means carried by the casing for clamping the windshield therein when in either raised or lowered position, a plurality of spring rollers arranged in the body of the vehicle, the side and top curtains carried by the rollers, detachable supporting members for holding the curtains in raised position and means for detachably connecting the curtains with the supporting members and with the windshield.

3. In a motor vehicle having a rumble seat compartment and a rumble seat having an opening in its back, a spring roller in the opening, a curtain on the roller, spring rollers at the sides of the compartment, side curtains connected with said rollers, the top walls of the compartment adjacent the sides thereof having slots therein through which the side curtains pass, a casing in the front part of the compartment, a windshield slidably mounted in the casing, means for holding the windshield in raised position, a pair of members, each having a vertical rear portion and a substantially horizontal portion, socket members at the ends of the upper edge of the back of the rumble seat for receiving the lower ends of the vertical portions of said members, and means for detachably connecting the curtains to said members and to the windshield.

In testimony whereof we affix our signatures.

HARRY A. HARTZELL.
HOMER F. HOOPER.